Figure 1:
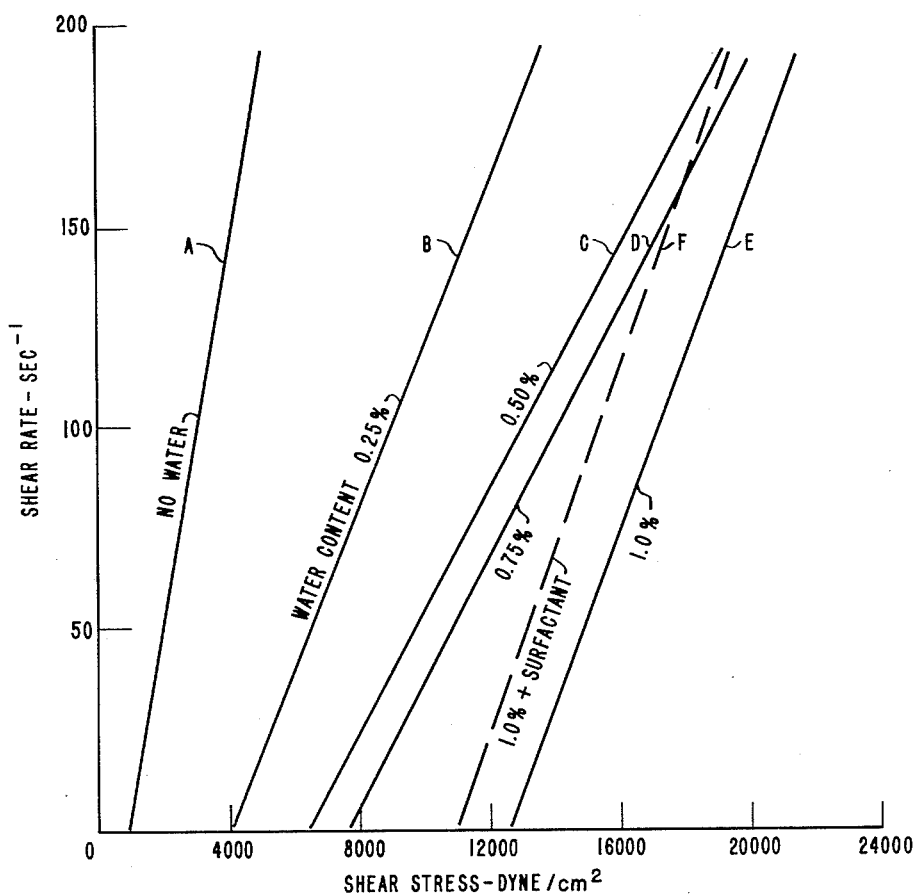

INVENTOR:
PAUL RAY SCOTT

:::: {.columns}
::: {.column}
United States Patent Office 3,206,256
Patented Sept. 14, 1965

3,206,256
TRANSPORTATION OF DISPERSED SOLID
PARTICLES IN PIPE LINES
Paul Ray Scott, Houston, Tex., assignor to Shell Oil Company, New York, N.Y., a corporation of Delaware
Filed July 15, 1963, Ser. No. 294,961
6 Claims. (Cl. 302—66)

The invention relates to the transportation in pipe lines of solid particles dispersed in a carrier liquid in which said particles are substantially insoluble, and is particularly concerned with improvements in maintaining the said particles in suspension. The invention can be applied to a variety of granular materials and is especially concerned with the transportation in oil of water-soluble chemicals, usually inorganic, such as potash, potash salts, i.e., unpurified potassium chloride, sodium chloride, soda ash, sodium sulphate and phosphate rock; it may, however, also be applied to the transportation in an aqueous carrier liquid of water-insoluble granules such as coal and iron ore.

The transportation of such granular material is known and presents the problem of maintaining the granules in suspension within the carrier liquid. Thus, when as is usually the case the particles have a density greater than that of the carrier liquid they tend to settle to the bottom of the pipe line unless the flow velocity is sufficient to create the turbulence required to counteract settling; upward settling may occur when the granules are less dense than the liquid. It is, however, often too costly to flow the dispersion through a pipe line at the high flow rates required to prevent settling; further, it is occasionally necessary to interrupt flow. Certain techniques for overcoming this problem are contained in the U.S. patent to Cross, No. 2,610,900, issued September 16, 1952.

According to techniques heretofore proposed for restraining the migration of the solid particles through the carier liquid due to density differences are control of the particle size, control of the viscosity of the liquid, and the formation of emulsions. These techniques seek to influence in a favorable direction factors in Stoke's law, a statement of which is:

$$F = kndv$$

wherein $F$ = force of liquid friction on a particle settling through a liquid due to density difference,
$k$ = a proportionality constant,
$n$ = viscosity of the liquid,
$d$ = diameter of the particle, and
$v$ = settling velocity.

Reduction of the settling tendency by reducing the particle diameters is often detrimental to the material being transported because it prevents the desired recovery of the particles at their destination in their sizes, e.g., for dust-free storage or utilization. The cost of initial grinding is usually a drawback and reconstituting the particles into a commercially attractive material at the destination is often impossible and usually prohibitively high in cost.

Increase in the viscosity of the carrier liquid increases pumping costs and requires the addition of considerable quantities of chemiicals, such as metalic soaps, which are expensive and often contaminate the carrier liquid, such as petroleum products. The chemicals may be so costly as to prohibit use of this approach.

The formatiton of an emulsion, briefly, involves emulsifying in the carrier oil an aqueous phase which contains the solids partly in suspension and partly in solution in the water, so that the density of the aqueous phases is closer to that of the oil. This requires the operations of
:::
::: {.column}
forming the aqueous phase, of forming an emulsion—including the incorporation of a stabilizer—in addition to the breaking of the emulsion and the recovery of the solids from the water at the destination. It requires special techniques such as vaporizatiton to recover the dissolved portions of the solids. Finally, to be effective, comparatively large amounts of water must be transported.

It is the object of this invention to provide an improved method for controlling the tendency of the particles to migrate through the carrier liquid due to density difference which method does not depend upon the control of the viscosity of the carrier liquid or the formation of emulsions with said liquid, and wherein the diameters of the individual particles need not be reduced.

A further object is to provide an improved technique for restraining the migration of small solid particles through a carrier liquid during flow through a pipe line which can be practiced without substantially contaminating the carrier liquid and which makes possible the recovery of the particles from the carrier liquid after transport in a simple and effective manner.

A specific object is to transport inorganic, water-soluble chemicals of the type indicated in granular form dispersed in oil, which oil may be either crude oil or a petroleum product from a refinery, wherein substantially complete recovery of the chemicals is attained and there is only a slight effect on the properties of the remaining carrier oil.

Figure 2:
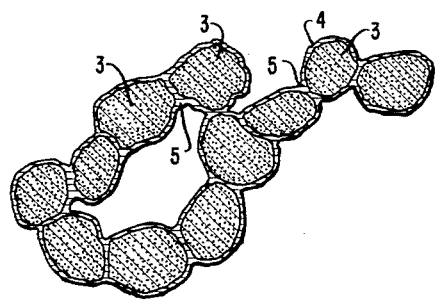

This specificatiton is accompanied by a drawing wherein:

FIGURE 1 is a graph showing shear stress-shear rate relationships for various agglomerates of potassium chloride, and FIGURE 2 is a sectional view through a part of an agglomerate formed according to the invention.

In summary, according to the invention the particles to be transported are agglomerated by applying a thin film of an agglomerating liquid which is substantially immiscible with the carrier liquid and which wets said particles preferentially over the carrier liquid; the resulting agglomerates are dispersed in the carrier liquid and transported therewith through a pipe line. By this technique it is possible to transport directly in a given carrier liquid particles, having larger diameters than would otherwise be possible having regard to the settling tendency for like flow conditions in the pipe line.

The particles may have diameters from 1 to 4000 microns or more. When used to avoid comminution of the parties, most or all ofthe material will consist of particles larger than about 500 microns.

Only a small amount, e.g., from 0.1 to 3.0 percent by volume of the agglomerating liquid (based on the volume of solids) is applied. It was found that a minimum amount of agglomerating liquid is critical for each substance, although the applicable value may vary for different substances. The stated range is generally applicable to the case wherein this liquid is water and is applied to inorganic, water-soluble salts for transport in dispersion in oil. For other solid materials and/or carrier liquids the optimum range can be readily determined from the following description. The use of more liquid than necessary leads to higher friction losses, as will be shown hereinafter with reference to FIGURE 1.

The amount of agglomerating liquid used is preferably the least that which will maintain the agglomerates in being without undue disruption due to turbulence and viscous drag in the carrier liquid. It is believed that the minimum amount to produce agglomeration is that required to produce a film whose thickness is at least of the order of 2 microns. The use of larger amounts of the
:::
::::

agglomerating liquid, to form films of thickness of the order of 20 microns, is possible and this increases the strengths of the bonds but also increases the viscosity of the dispersion and, therefore, results in excessive pumping costs.

The film of agglomerating liquid forms weak mechanical networks bridging individual particles, making the coated particles adhere to each other, as is shown in FIGURE 2. In this view the particles, shown at 3, are coated with thin films 4 of an agglomerating liquid. Where these coated granules come together, as at 5, bridging of the film occurs to hold the granules in clusters. The resulting agglomerates have low bulk densities prior to dispersion in the carrier liquid, having, for example, from about 35 to 70% void spaces. When these agglomerates are dispersed in the carrier liquid the latter fills these voids, producing a three-phase mass (carrier liquid, particles, and agglomerate liquid film) which, although many titmes larger than the individual particles, has a reduced tendency to settle because its density is far closer to the density of the carrier liquid than is the density of the original solid particles. In addition, the mechanical network formed by the bridging is sufficiently strong to prevent settling of the larger individual particles, thus preventing the force of gravity from segregating particles according to size as would happen if the mechanical network was not present.

The agglomerates formed in accordance with this process may have diameters from a fraction to 100% of the diameter of the pipe line, and they may include a small fraction to 100% by volume of the original solids in the carrier liquid.

The agglomerates can be recovered from the carrier liquid at the destination by any suitable expedient, among which are filtration and phase transfer. The latter method, although not my invention, is described to facilitate practice of the invention. As applied to water-soluble chemicals, this phase-transfer method involves bringing the dispersion into contact with a saturated aqueous solution—called "brine"—of the water-soluble chemical or of one having similar solubility characteristics. The solid particles, being preferentially wetted by water, and having a higher specific gravity enter the brine. Upon entering the water phase or brine the mechanical bonds no longer exist and the agglomerates lose their identity and particles settle independently. Tests made on the crude oil remaining after separatiton of unrefined potassium chloride showed no increase in water-soluble salts but did show a moderate increase in ash content.

Surfactant agents may be added together with the agglomerating liquid to control the strength of the bond formed by the interface between the two immiscible liquids, thus controlling the strength of the mechanical bond holding the particles together.

The dispersion or slurry of agglomerates in the carrier liquid exhibit characteristics of Bingham Plastics, i.e., it exhibits a yield point when its shear rate vs. shear stress curve is extended to zero shear rate. FIGURE 1 shows at B–E a set of such curves for dispersions of unpurified potassium chloride to which different amounts of water (0.25, 0.50, 0.75 and 1.0% by volume, respectively) had been added as the agglomerating liquid, and at A for non-agglomerated particles to which no water had been added. The salt particles in all cases had a specific gravity of 2.0, diameters of about 250 microns, and were wetted by adding water to the salt and petroleum slurry in a mixer and the agglomerates formed in situ by stirring to promote contact between wetted particles. The carrier liquid was a petroleum oil having a viscosity of about 5.5 cs. and a specific gravity of 0.859. The amount of solids dispersed was 50% by weight based on the carrier oil. The shear stresses, plotted as absciasae, were determined for these dispersions at 75° F. for different shear rates as indicated by the ordinates. In adition, similar measurements were made on an agglomerate containing 1% of water to which 0.01 of an alkyl-aryl salt type of soap (sold commercially under the trademark Tide), a surfactant, had been added, and the measurements are shown as the dashed curve F. The slope viscosities were calculated from these lines and their yields were determined from the intercepts of the lines with the ordinate axis. The results are summarized in the following table:

| Sample | Percent Water | Slope Viscosity, Centipoises | Yield, Dynes per $cm.^2$ |
|---|---|---|---|
| A | 0 | 20.5 | 1,000 |
| B | 0.25 | 49.5 | 4,000 |
| C | 0.50 | 70 | 6,500 |
| D | 0.75 | 63 | 7,600 |
| E | 1.00 | 47 | 12,500 |
| F | 1.00 +surf. | 42 | 11,000 |

The higher yields at higher water contents demonstrates the undesirability of using more water than necessary to attain agglomeration. The lower yield resulting from the addition of the surfactant demonstrates how the yield value, i.e., mechanical strength of the bond, may be affected or controlled. All of the agglomerates tested had sufficient mechanical strength to remain in being when flowed through a pipe wherein the shear rate was 300 $sec.^{-1}$.

Concerning the agglomeration of materials such as coal and other materials, sluries of coal-in-water and sulfur-in-water were made and a third immiscible phase was added. The addition of naphtha (0.25 to 1.00% by volume) to a coal-water slurry produced effects similar to those brought about by addition of water to a potash-crude oil slurry. It was noted that the effect was of a relatively short duration, one to two days, when 0.25% by volume of naphtha was added, but could be restored by another addition of naphtha. A 41% by volume coal-in-water slurry was treated with 0.5% by volume of naphtha. The mechanical bonding, formation of agglomerates, occurred in situ when the mixture was agitated. The bond was sufficiently strong to suspend in the slurry 0.25-inch diameter coal particles. The 41% by volume coal used in the slurry had the following sieve analysis:

U.S. Sieve No.: Particles, percent w.
Retained on—
16 _____ 3.5
30 _____ 7.3
50 _____ 20.9
100 _____ 24.6
200 _____ 17.0
325 _____ 7.6
Passed 325 _____ 19.1

Slurries containing 35% by volume of sulfur-in-water were made. Agglomerates of sulfur formed while attempting to wet the sulfur with water. The immiscible third phase inthis case was air. Comparing the properties of sulfur-water slurries containing air, and benzene as the immiscible third phase, indicated the strength of the bond formed by the benzene-water interface was stronger than the air-water interface bond.

In the cases described above the use of an additive, surfactant, to control the strength of the interfacial bond and control of the quantity of immiscible fluid added would afford better control of the slurry properties.

I claim as my invention:

1. In the method of transporting solid particles in dispersion within a carrier liquid in which said particles are essentially insoluble, the improvement of restraining said solid particles against relative vertical migration through said liquid due to density differences by forming agglomerates of said particles, said agglomerates including on the surfaces of said particles a film-forming amount of an agglomerating liquid which is substantially immiscible with said carrier liquid and containing voids, dispersing the resulting agglomerates in the carrier liquid, and flowing the resulting dispersion through a pipeline.

2. A method as defined in claim 1 wherein said carrier liquid is oil, said solid particles consist essentially of an inorganic, water-soluble substances and said agglomerating liquid is water.

3. A method as defined in claim 1 wherein said carrier liquid consists essentially of water, said solid particles are water-insoluble, and said agglomerating liquid is oil.

4. A method as defined in claim 2 wherein said substance is in the form of particles from 1 to 4,000 microns in diameter and the amount of water is from 0.01 to 3 percent of the substance.

5. A method as defined in claim 2 wherein said water contains a minor amount of a surfactant.

6. In the method of transporting solid particles in dispersion within a carrier liquid in which said particles are essentially insoluble, the improvement of restraining said solid particles against relative vertical migration through said liquid due to density differences by forming on the surfaces of said solids thin films, of the order to two to twenty microns in thickness, of an agglomerating liquid which preferentially wets said solid particles in relation to said carrier liquid, forming void-containing agglomerates of said film-coated particles, dispersing said agglomerates in the carrier liquid, and flowing in resulting dispersion through a pipe line.

References Cited by the Examiner

UNITED STATES PATENTS

| | | | |
|---|---|---|---|
| 1,390,230 | 9/21 | Bates | 302—66 |
| 2,128,913 | 9/38 | Burk | 302—66 |
| 2,686,085 | 8/54 | O'Dell | 302—66 |

FOREIGN PATENTS

| | | |
|---|---|---|
| 939,018 | 2/56 | Germany. |

SAMUEL F. COLEMAN, *Primary Examiner.*

ANDRES H. NIELSEN, *Examiner.*